United States Patent [19]

Nirdosh

[11] Patent Number: 4,649,029
[45] Date of Patent: Mar. 10, 1987

[54] PROCESSES FOR EXTRACTION OF URANIUM AND RADIUM FROM URANIUM-CONTAINING ORES USING FERRIC NITRATE

[76] Inventor: Inderjit Nirdosh, 494 Ryerson Crescent, Thunder Bay, Ontario, Canada, P7C 5R8

[21] Appl. No.: 599,896

[22] Filed: Apr. 13, 1984

[51] Int. Cl.$^4$ .................. C01G 43/00; C01F 13/00
[52] U.S. Cl. ........................... 423/8; 423/2; 423/3; 423/10; 423/20
[58] Field of Search .................. 423/2, 3, 18, 8, 20

[56] References Cited

U.S. PATENT DOCUMENTS

| | | | |
|---|---|---|---|
| 2,506,945 | 5/1950 | Thomas et al. | 423/18 |
| 2,859,094 | 11/1958 | Schmitt et al. | 423/20 |
| 3,808,306 | 4/1974 | Smith et al. | 423/20 |
| 4,098,866 | 7/1978 | Carnahan et al. | 423/20 |
| 4,272,491 | 6/1981 | Schultze et al. | 423/20 |
| 4,374,096 | 2/1983 | Skeaff | 423/18 |
| 4,431,609 | 2/1984 | Scheitlin | 423/20 |
| 4,454,097 | 6/1984 | Nirdosh et al. | 423/2 |

Primary Examiner—Edward A. Miller
Attorney, Agent, or Firm—Hirons, Rogers & Scott

[57] ABSTRACT

Ferric nitrate leaching at 75° C. is found to remove up to 97% of the uranium and 93% of the radium from ores occurring in the Elliot Lake area of Canada, after an initial flotation-separation of the sulfide minerals from the ore. In processes of the invention an aqueous acidic ferric nitrate solution of relatively low concentration, e.g. 0.01M to 0.1M is used, giving tailings which are effectively sulfide-free (less than 0.45 wt %) and with radium levels approaching a desired maximum value of 24 pCi/g. Radium may be removed from the leachate by adsorption and uranium by solvent extraction. 80–87% of the ferric nitrate may be recirculated for further leaching. Because of the low reagent concentrations and the recycle of the ferric nitrate, it is possible to keep nitrate ion levels in the effluent below the prescribed level of 10 ppm.

11 Claims, 6 Drawing Figures

FLOW SHEET

FIG.1 FLOW SHEET

LEACHING TIME, h

Effect of leaching temperature on percentage extractions of uranium and radium.
L/S ratio: 2.5 ml/g, Time: 24 h, Leachant composition: 0.02 M each in ferric nitrate and nitric acid.

FIG. 2

Variation of e.m.f. during leaching.
Leachant composition: 0.02 M each in ferric nitrate and nitric acid.

FIG. 3

Effect of Ferric Ion Concentration on uranium and radium leaching.
Temp.: 75° C, L/S ratio: 2.5 ml/g, Time: 24 h.

Effect of liquid/solid ratio on percentage extraction of uranium and radium.
Temp.: 75°C, Time: 24 h, Leachant composition: 0.02 M each in ferric nitrate and nitric acid.

PROCESSES FOR EXTRACTION OF URANIUM AND RADIUM FROM URANIUM-CONTAINING ORES USING FERRIC NITRATE

FIELD OF INVENTION

The invention is concerned with improvements in or relating to processes for extracting both uranium and radium from uranium-containing ores.

REVIEW OF THE PRIOR ART

Uranium-238 and its decay daughter radium-226 are always found together in uranium ores. The two current commercial processes for uranium extraction (known in the industry as "milling"), employ either sulfuric acid or alkaline sodium carbonate as leachants along with an oxidizing agent, generally sodium chlorate or air. The acid process is by far the most common of the two. Uranium occurs in its ores in its most stable form, U(IV), which is insoluble. Ferric iron is commonly used in the milling processes to oxidize the U(IV) to the soluble U(VI) form, since the reaction rate constant for this type of oxidation is very large in the case of $Fe^{3+}$ (12.8 moles/l.s), much larger than for most other oxidizing agents, such as chlorate and oxygen etc. During the course of this oxidation, ferric iron is reduced to the ferrous state, and the function of the oxidizing agent in the uranium milling processes is to oxidize the $Fe^{2+}$ ions back to the $Fe^{3+}$ state to maintain the $[Fe^{3+}]$ concentration high during the leaching.

Unlike the sulfate and carbonate complexes of uranium, those of radium are insoluble. Thus, although uranium is effectively leached during the milling, the radium precipitates as radium sulfate or carbonate and/or as barium/lead-radium sulfate or carbonate coprecipitate, and/or as jarosites. These precipitates deposit over the finely ground gangue solids (silica, etc.) that are also present, and almost the entire amount of radium initially present in the ore eventually ends up in the solid mill wastes (mill tailings). Some of the radium salts are also adsorbed on the silica particles or the metal oxides, hydroxides or hydrated oxides present in the tailings. Radium in all these forms is prone to slow natural leaching from the tailings and thus prone to enter the biosphere.

In order to prevent the release of radium to the environment, the mill tailings are currently managed in Tailings Management Areas at a considerable cost. Because of the long half life of radium-226 (1620 years), these Areas need to be managed perpetually even after the closure of the originating mills. The presence of radium (and in some cases the sulfide minerals) in these finely ground solids makes them unfit for any other use, such as mine backfill or the construction of roads and airfields, etc.

To overcome the problem of long term tailings management alternative milling processes have been developed with the objective of producing tailings of low radium concentration by coextracting uranium and radium from the ore. Reagents that have been considered for coextraction are ferric chloride and nitric acid. In this regard ferric chloride was proposed hitherto in U.S. Pat. Ser. No. 2,894,804 of Sawyer and Handley, and a more highly developed process has subsequently been disclosed and claimed in U.S. Patent application No. 06/435,858, filed 21st Oct., 1982 of Inderjit Nirdosh, et al, now U.S. Pat. No. 4,454,097, the disclosure of which is incorporated herein by this reference.

Leaching of Uranium Ores with Nitric Acid is disclosed in U.S. Pat. No. 2,506,945 of H. C. Thomas, A. Tomcufcik, and in a process disclosed therein 100 g of ore were slurried with 43 ml of water and 43 ml of 69.5% nitric acid giving a nitric acid concentration in the leachant of 12.7M which amounted to a free $NO^-_3$ ion concentration of 825.5 g/l. After 3 hours, the temperature of the stirred slurry was raised to 95°-100° C. and leaching was continued. After another 10 hours, 50 ml of hot boiling water was added and the leaching was continued for another 20 hours at a temperature of 95°-100° C. and a liquid/solid ratio (L/S ratio) of 1.36 ml/g. The contents were then either filtered as such or after a further dilution by an additional 64 ml. Radium dissolved in this treatment was removed from the leachate by precipitation either as barium radium sulfate or barium radium carbonate, and 75-99.9% radium recoveries were obtained. After removing the radium, the solution was treated for uranium recovery. No recycle of the leaching solution was attempted.

The nitric acid leaching of radium and other significant radionuclides from uranium ores and tailings was disclosed in Oak Ridge National Laboratory Report No. ORNL/TM-5944, (1977) of A. D. Ryon, F. J. Hurst and F. G. Seeley, wherein 100 g of the ore was leached with 200 ml of nitric acid solution at 70° C. for 5 hours in either single or two or three stage leaching experiments. 95-99% Radium and 99% uranium were leached in multi-stage leaching tests with a nitric acid concentration of 3M giving a free $NO^-_3$ ion concentration in the leachant equal to 195 g/l. The residual radium left in the leach residues was 17-62 pCi/g.

DEFINITION OF THE INVENTION

It is therefore the principal object of the invention to provide new processes for the extraction of both uranium and radium for uranium ores using an aqueous ferric nitrate leachant.

In accordance with the present invention there is provided a process for the extraction of both uranium and radium from uranium containing ores using an aqueous solution of ferric nitrate leachant in the presence of an interfering sulfate ion resulting from the presence of sulfide therein, the process including the steps of (a) mechanically treating the finely ground ore for the removal of sulfide therefrom;

(b) leaching the mechanically treated finely ground ore with aqueous acidic ferric nitrate solution in a concentration from 0.01 to 0.1M for the removal of uranium and radium therefrom to result in a liquid ferric nitrate leachate containing radium and uranium and a wet cake containing radium, uranium and ferric nitrate;

(c) treating the ferric nitrate leachate to separate uranium and radium therefrom;

(d) separately treating the wet cake for removal of retained ferric nitrate and the residual radium and uranium therefrom; and (e) recirculating a major portion of the ferric nitrate leachate from step (c) for the leaching of more of the mechanically treated finely ground ore.

In a process in which the interfering ion is sulfate formed from pyrite and pyrrhotite the mechanical treatment consists of flotation removal thereof.

Ferric nitrate is attractive as a possible leaching agent for uranium and radium from its ores for the following reasons:

(a) In an aqueous solution of ferric nitrate, the $Fe^{3+}$ cation is very effective in oxidizing uranium in the ore from the insoluble U(IV) to the soluble U(VI) form, and (b) The standard reduction potentials of the $Fe^{3+}/Fe^{2+}$ and $NO/NO^-_3$ half cell reactions are such that the $NO^-_3$ anion can oxidize $Fe^{2+}$ to $Fe^{3+}$ in acidic medium at appropriate ionic concentrations in the solution.

The disadvantage hitherto of the use of the nitrate, even if it has previously been considered for this purpose, is the very low levels of nitrate residues that are permitted in waste materials, e.g. parts per million, which have been difficult to achieve economically.

DESCRIPTION OF THE DRAWINGS

Processes which are particular preferred embodiments of the invention will now be described, by way of example, with reference to the accompanying drawings, wherein.

DESCRIPTION OF THE PREFERRED EMBODIMENTS

The processes of the invention have been applied particularly to ore obtained from the Quirke Mill of Rio Algom Mines, Elliot Lake, Ontario, Canada. The ore typically contains 0.1% uranium mainly as uraninite (U, Th)$O_2$ and brannerite (U, Th)$Ti_2O_6$. A significant amount of pyrite, $FeS_2$, is present, typically in the order of 5–7% by mass, together with a substantially smaller amount of pyrrhotite (FeS). The ore also contains barium and lead minerals, in small quantities.

Ferric iron is known to be an effective oxidizing agent for sulfide minerals also. Thus, when a uranium ore such as the Elliot Lake ore containing sulfide minerals is treated with an aqueous leaching solution containing $Fe^{3+}$ ions, sulfate ions are formed by solutions from the partial oxidation of pyrite ($FeS_2$) and pyrrhotite (FeS) by the ferric nitrate. This leads to the formation of $BaSO_4$ and $PbSO_4$ with coprecipitation of the radium as the relatively insoluble sulfate. Thus, removal of the sulfide minerals from the ground ore, prior to leaching with ferric nitrate is essential for good radium extraction.

In accordance with this invention the finely ground ore material is subjected to a mechanical treatment step for the removal therefrom of the interfering sulfide minerals, or at least the reduction of the concentration thereof to an economically reasonable level, i.e. below 0.45% by weight. Because of the already finely divided state of the ore this mechanical separation step preferably is a mechanical froth flotation. This flotation step separates the ore into two fractions, a sulfide-rich fraction and a sulfide-lean fraction. These two fractions are designated herein as the Sulfide-Concentrate and the Sulfide-Float-Tails, respectively, the Sulfide-Float-Tails normally comprising nearly 93 wt % of the ore subjected to flotation. It is the Sulfide-Float-Tails which constitute the starting solid feed for the leaching of uranium and radium with ferric nitrate.

The leachant solutions for various tests were prepared by dissolving ferric nitrate in deionized water. Nitric acid was also added in the solution to a concentration equal to that of the ferric nitrate to keep a pH of below 2, preventing the hydrolysis of Fe(III) and also to provide $H^+$ ions. It may be noted that the $NO^-_3$ ions are effective oxidizing agents for $Fe^{2+}$ (to $Fe^{3+}$) in the presence of $H^+$ ions.

Figure 2:
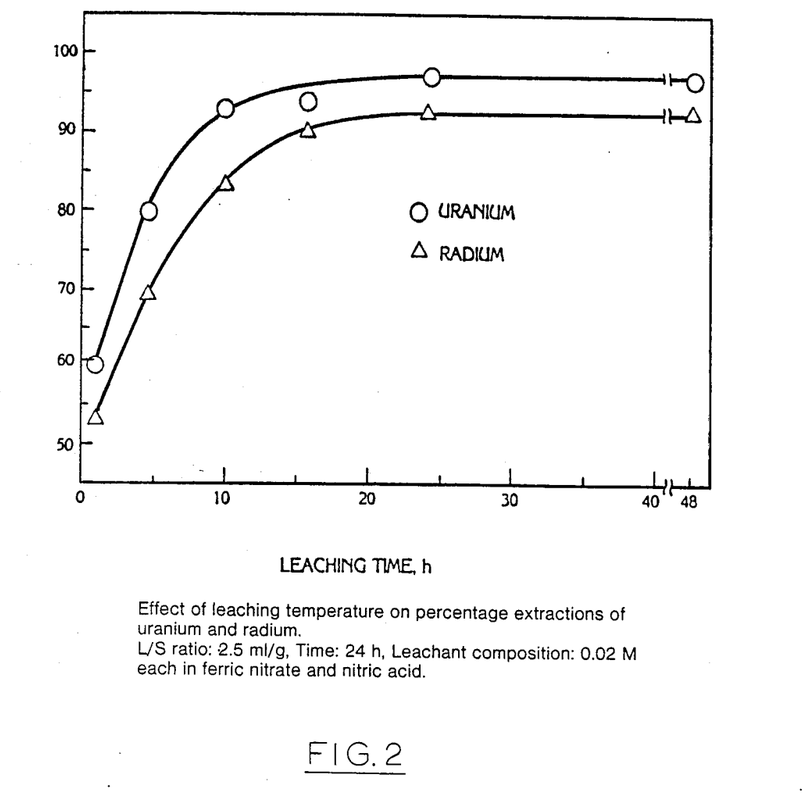
FIG. 2 is a graph showing the effect of time of contact on the extraction of uranium and radium.

FIG. 2 shows the percentages of uranium and radium extractions from the Sulfide-Float-Tails at a solution composition 0.02M each in ferric nitrate and nitric acid, at 75° C. and a L/S ratio of 2.5 ml/g. The leach time was varied from 1 to 48 hours and the percentage extractions of uranium and radium are plotted vs. time. It is found that uranium extractions above 90% are obtained after 8 hours whereas similar radium extractions are only obtained after nearly 15 hours. For the economic recoveries of uranium (97%) and radium (93%), a leaching time of 24 hours is found to be optimum.

Figure 3:
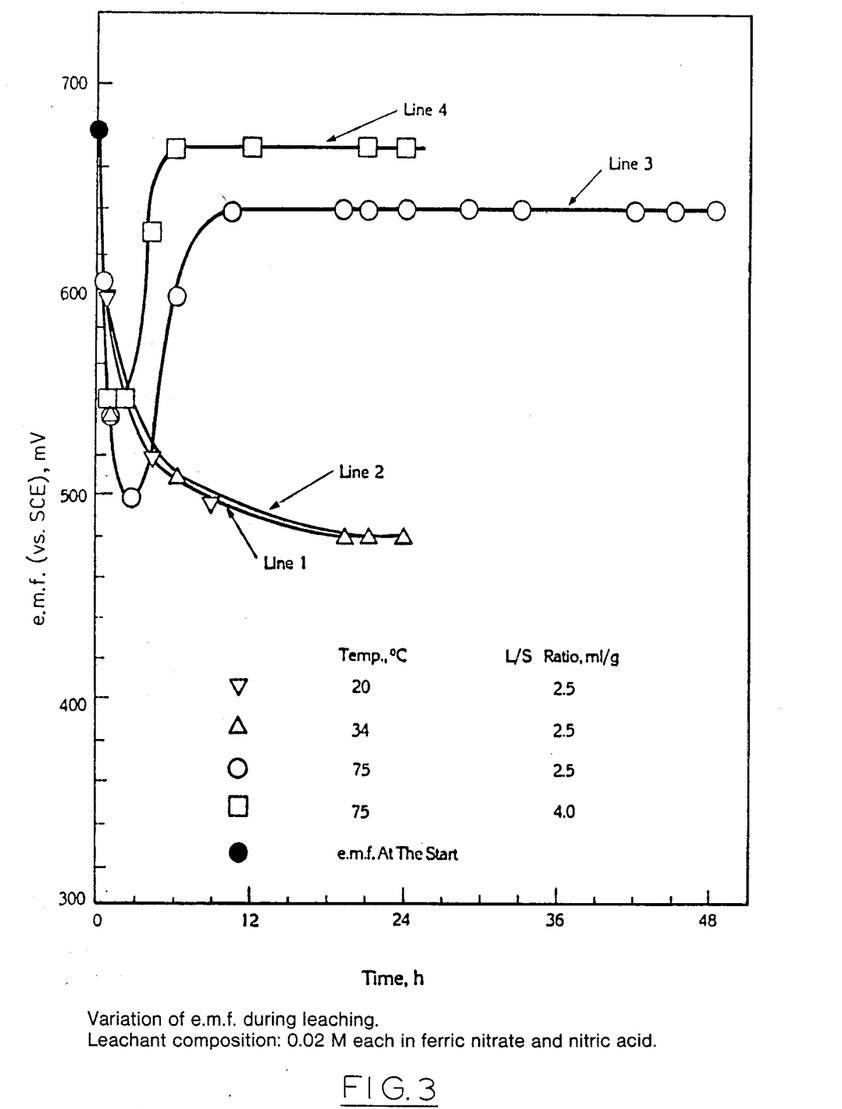
FIG. 3 is a graph showing the changes in e.m.f. during leaching of feed materials.

FIG. 3 shows the changes in electromotive force (e.m.f.) of the system with time during leaching. The leaching system's e.m.f. plays a significant role in the dissolution of uranium (the oxidation of U(IV) to U(VI)), and some detailed e.m.f. studies were therefore made. The changes in the e.m.f. of the system were measured with time during leaching, using a saturated calomel reference electrode. In all these tests the leachant concentration of 0.02M each in ferric nitrate and nitric acid was used and the effects of temperature, L/S ratio and time on the system e.m.f. were investigated. Four tests were performed. In three tests the temperatures of 20, 34 and 75° C. were studied at a constant L/S ratio of 2.5 ml/g and in the fourth test an L/S ratio of 4 ml/g was studied at a temperature of 75° C. The variations of e.m.f. with time in these cases are plotted as lines 1, 2, 3 and 4, respectively.

A comparison of these lines indicates that at low temperatures of 20° and 34° C. (lines 1 and 2), there is a continuous fall in the e.m.f. as the leaching proceeds, whereas, when the temperature is high (75° C., lines 3 and 4), the e.m.f. typically shows a continuous fall for an initial small period of 2–3 hours, and then a steady rise to a final maximum value in about 7–10 hours and remains constant thereafter.

The following explanations are suggested for these observations.

(i) The Temperature vs. e.m.f.

The e.m.f. of the leaching system is proportional to the electromotive forces (E) of the half cell reactions involved which are calculated from the well known Nernst equation. For the $Fe^{3+}/Fe^{2+}$ half cell reaction, this thermodynamic equation may be written as $$E = E_o + \frac{RT}{nF} \ln \frac{[Fe^{3+}]}{[Fe^{2+}]} \quad (1)$$

where
$E_o$ is the standard reduction potential;
F is Faradays;

n is the number of electrons taking part in the reaction;

R is the gas constant; and

T is temperature.

Lines 1 and 2 in FIG. 4 indicate that when the temperature is below 34° C., the e.m.f. falls continuously and shows no reversal for the entire 24 hour period. A continuous fall in the system e.m.f. reveals that as the leaching proceeds, the $[Fe^{3+}]/[Fe^{2+}]$ ratio in the system progressively decreases, in accordance with equation (1), and that under these test conditions the $Fe^{2+}$ ions produced during leaching are not oxidized. Lines 3 and 4 however indicate that when the temperature is high (75° C.), after the initial short period of decline, the e.m.f. shows a reversal and starts rising steadily. Such a rise in the e.m.f. is possible only when the $Fe^{2+}$ ions produced during leaching are oxidized by an oxidizing agent, improving the $[Fe^{3+}]/[Fe^{2+}]$ ratio in the system and hence the e.m.f. It may therefore be concluded that the $NO^{-}_3$ ions become effective in oxidizing the $Fe^{2+}$ ions only at higher temperatures. This may be due to the activation energy requirements.

(ii) The Liquid/Solid Ratio vs. e.m.f.

A comparison of the lines 3 and 4 reveals that when the L/S ratio is higher, at all times the e.m.f. of the system remains higher, the value of the maximum e.m.f. attained is also higher, and the periods of the initial decline in the e.m.f. and its eventual rise to the maximum value are shorter than for a lower L/S ratio.

The oxidation reaction of U(IV) by the $Fe^{3+}$ ions may be expressed by the equation $$U(IV) + 2Fe^{3+} + U(VI) + 2Fe^{2+} \quad (2)$$

According to this equation, 2 moles of $Fe^{3+}$ are reduced and 2 moles of $Fe^{2+}$ are produced for every mole of the U(IV) oxidized and dissolved. A reference to FIG. 6 indicates that the percentage uranium extractions are the same (97%) at both the L/S ratios of 2.5 and 4 ml/g. Thus, the amounts (moles) of uranium dissolved and the $Fe^{2+}$ ions produced during leaching are the same in both these cases. Thus, when the L/S ratio is larger (4 ml/g), the concentration of the $Fe^{2+}$ ions (moles/liter) remains smaller in the system and the $[Fe^{3+}]/[Fe^{2+}]$ ratio, and hence the e.m.f., remain higher than in the case of a lower L/S ratio.

(iii) The Time vs. e.m.f.

As noted from the Nernst equation given above, the e.m.f. of the system at anytime is proportional to the $[Fe^{3+}]/[Fe^{2+}]$ ratio in the system at that time. As the leaching of uranium commences, i.e., as the oxidation of U(IV) starts, due to the formation of the $Fe^{2+}$ ions according to equation (2), the $[Fe^{3+}]/[Fe^{2+}]$ ratio in the system falls and so does the e.m.f.

The standard reduction potential ($E_o$) of the $Fe^{3+}/Fe^{2+}$ couple is 0.77 V and that of the $NO/NO^{-}_3$ couple is 0.96 V. The difference between these values gives the driving force for the oxidation reaction at the standard conditions and suggests that the $NO^{-}_3$ ions are thermodynamically capable of oxidizing the $Fe^{2+}$ ions. At the starting time, the $[Fe^{3+}]/[Fe^{2+}]$ ratio in the system is very high. However, with the passage of time, the $[Fe^{3+}]/[Fe^{2+}]$ ratio falls which results in the lowering of the operative half cell e.m.f. (E) of the $Fe^{3+}/Fe^{2+}$ couple. The difference between the operative half cell electromotive forces of the $Fe^{3+}/Fe^{2+}$ and the $NO/NO^{-}_3$ couples in the system therefore widens, which indicates an increase in the operating driving force and thus the effectiveness of the $NO^{-}_3$ ions to oxidize the $Fe^{2+}$ ions.

Lines 3 and 4 indicate that the $NO^{-}_3$ ions start oxidizing the $Fe^{2+}$ ions noticeably only after an initial period of 2-3 hours. It appears that the oxidation reaction by the $NO^{-}_3$ ions is not apparently initiated until a certain minimum value of the $[Fe^{3+}]/[Fe^{2+}]$ ratio is reached in the system. From FIG. 2, the percentage uranium extraction after 3 hours is nearly 73% for the same leaching conditions as for line 3 in FIG. 3. A simple calculation reveals that this corresponds to a $[Fe^{3+}]/[Fe^{2+}]$ ratio of nearly 9 at that time. This indicates that the $NO^{-}_3$ ions become effective in oxidizing the $Fe^{2+}$ ions when the $[Fe^{3+}]/[Fe^{2+}]$ ratio is lower than 9. This ratio seems necessary to provide the necessary driving force to obtain a finite reaction rate and apparently initiate the oxidation reaction by the $NO^{-}_3$ ions. The steadily rising portions of lines 3 and 4 indicate that once the oxidation reaction is initiated, it remains propagated thereafter even at $[Fe^{3+}]/[Fe^{2+}]$ ratios of larger than 9.

The horizontal portion of the e.m.f. vs. time plots of lines 3 and 4 may be explained as follows. In about 10 hours, nearly 92-93% of the uranium is already leached (reference FIG. 2). After this time, only a small additional amount of uranium is leached and therefore only a small amount of the $Fe^{3+}$ ions are reduced to the $Fe^{2+}$ state, according to equation (2). Since the oxidation of $Fe^{2+}$ ions is already in propagation at this time, the $Fe^{2+}$ ions are oxidized by the $NO^{-}_3$ ions at a rate nearly equal to the rate of their formation. Thus, the $[Fe^{3+}]/[Fe^{2+}]$ ratio in the system essentially remains constant after 10 hours, and so does the system e.m.f.

Figure 4:
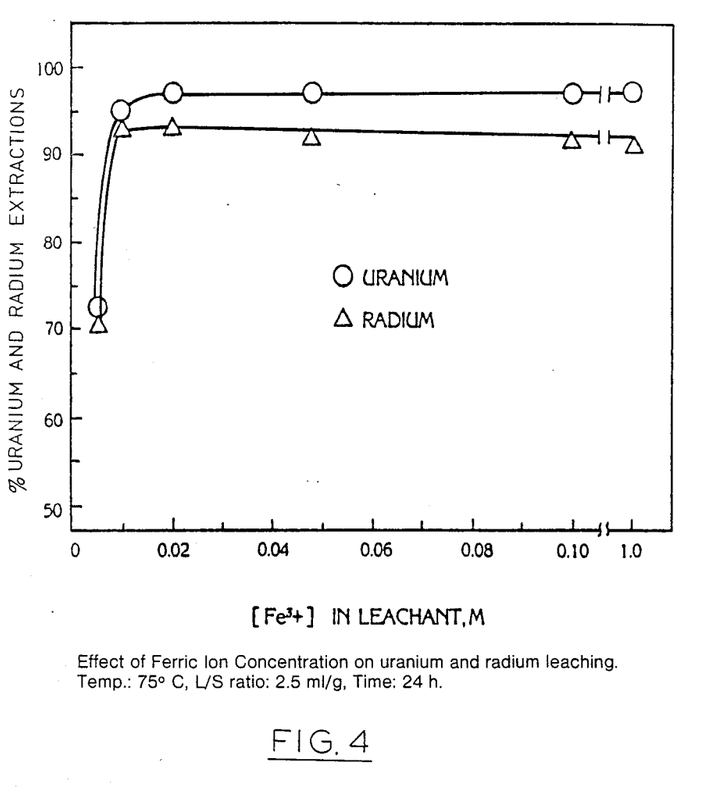
FIG. 4 is a graph showing the effect of changes in ferric ion concentration on the extractions of uranium and radium in a process of the invention.

FIG. 4 is a plot of the concentration of the $Fe^{3+}$ iron in the leachant vs. the percentage uranium and radium extractions. All the tests were performed at a temperature of 75° C., a L/S ratio of 2.5 ml/g and for a leaching time of 24 hours. The results indicate that the $[Fe^{3+}]$ of as low as 0.01M (0.55 g/l) is effective for obtaining nearly 95% uranium and 93% radium extractions. Since recovery of the maximum quantities of uranium from the low grade ores is essential for economic reasons, the optimum $[Fe^{3+}]$ may be chosen as 0.02M (1.1 g/l). It is evident from the figure that there is no additional advantage in using ferric concentrations higher than 0.02M.

Figure 5:
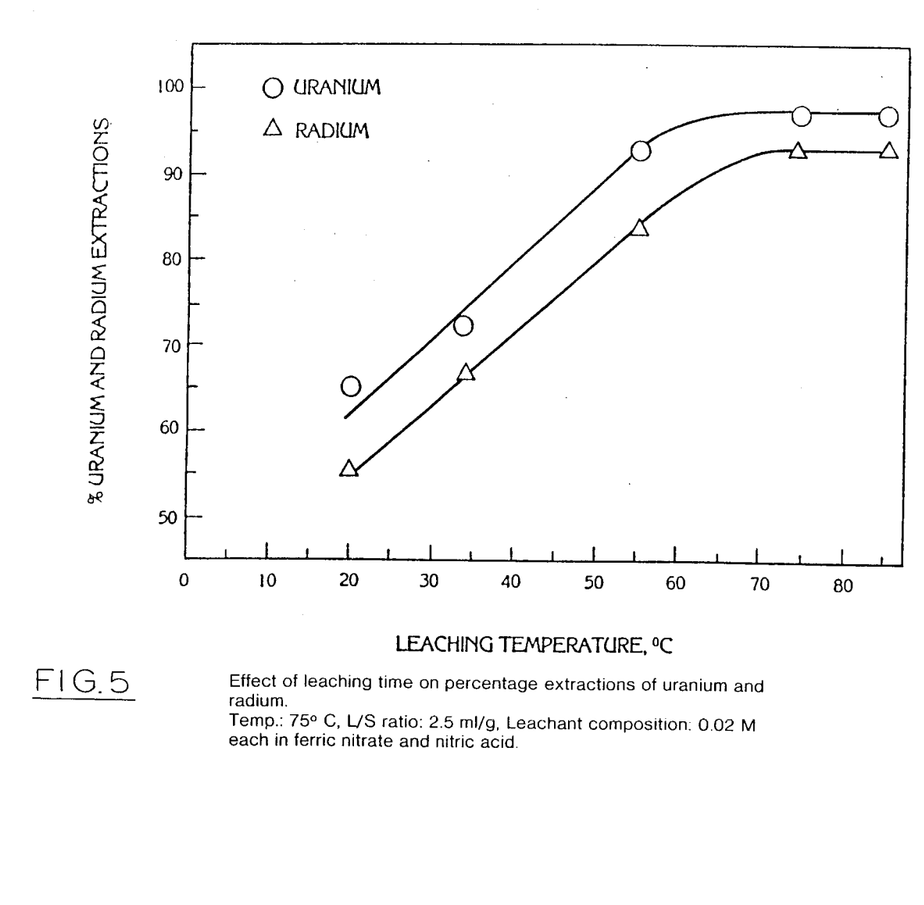
FIG. 5 is a graph showing the effect of temperature on the extractions of uranium and radium in a process of the invention.

FIG. 5 is a graph showing the effect of temperature on the uranium and radium extractions.

Leaching experiments were performed with aqueous solutions of concentration 0.02M both in ferric nitrate and nitric acid. The leaching was done for 24 hours at a L/S ratio of 2.5 ml/g. Temperatures of 20°, 34°, 55°, 75° and 85° C. were studied. It is found that temperatures above 70° C. are quite effective. For the economic recoveries of uranium and radium, 75° C. is found optimum.

Figure 6:
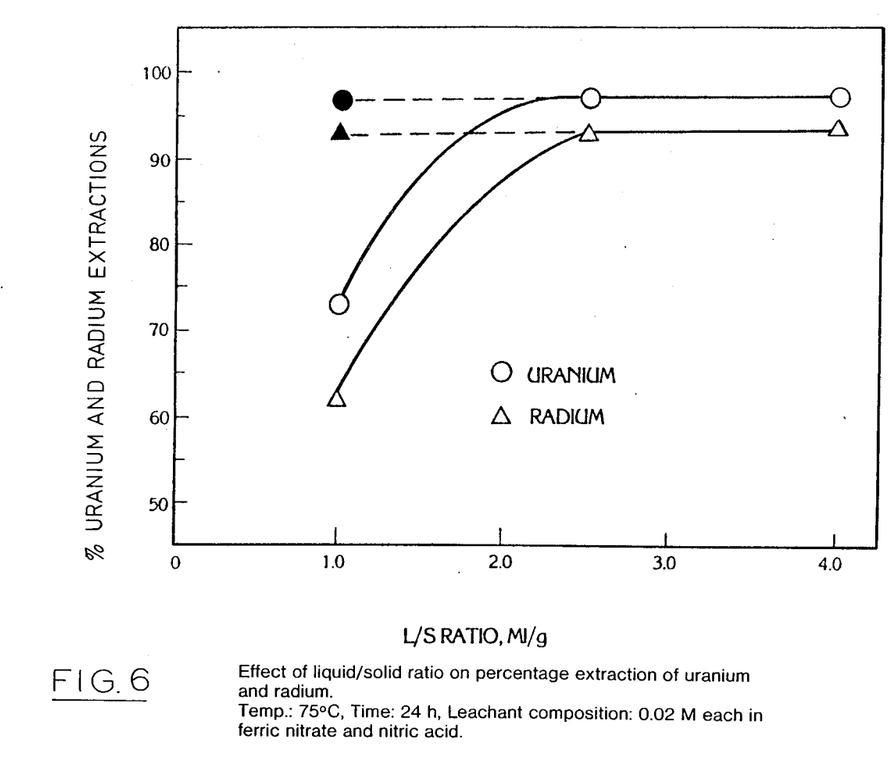
FIG. 6 is a graph showing the effect of L/S ratio on the extractions of uranium and radium in a process of the invention.

FIG. 6 gives the effect of the L/S ratio on the percentage extractions of uranium and radium. All the tests were performed at 75° C., for 24 hours, with the leaching solution of composition 0.02M both in ferric nitrate and nitric acid. The solid lines in FIG. 6 indicate that although the percentage extractions of both uranium and radium remain unchanged (97% and 93%, respectively) when the L/S ratio is 2.5 ml/g or higher, the extractions fall drastically to 73% and 62% respectively when the L/S ratio is 1 ml/g. As discussed above, this is because the $[Fe^{3+}]/[Fe^{2+}]$ ratio in the system falls progressively as the L/S ratio is decreased. This lowers the e.m.f. of the system and hence affects the extraction of uranium and therefore of radium, adversely. The final e.m.f. recorded in the case of the L/S ratio of 1 ml/g was 380 mV as compared to 640 mV and 670 mV at L/S ratios of 2.5 and 4 ml/g respectively.

The standard reduction potential ($E_o$) of the $ClO^-_3/HClO_2$ couple is 1.21 V as compared to 0.96 V for the $NO/NO^-_3$ couple. This suggests that sodium chlorate is a much stronger oxidizing agent than the $NO^-_3$ ions Thus, a test was performed at a L/S ratio of 1 ml/g, keeping all other conditions the same as before, with an addition of 0.1 g sodium chlorate to the system per 100 g of the solid feed taken for leaching. This test gave a uranium extraction of 96% and a radium extraction of 93%. The final e.m.f. was found to be 635 mV. These two data points are plotted as a solid-circle and a solid-triangle respectively in FIG. 6, and are joined to their respective data points by the dotted lines.

This study suggests that the uranium and radium extractions are insensitive to the liquid/solid ratio when this ratio is kept equal to or more than 1 ml/g, provided the $Fe^{2+}$ ions are adequately oxidized to the $Fe^{3+}$ state.

Figure 1:
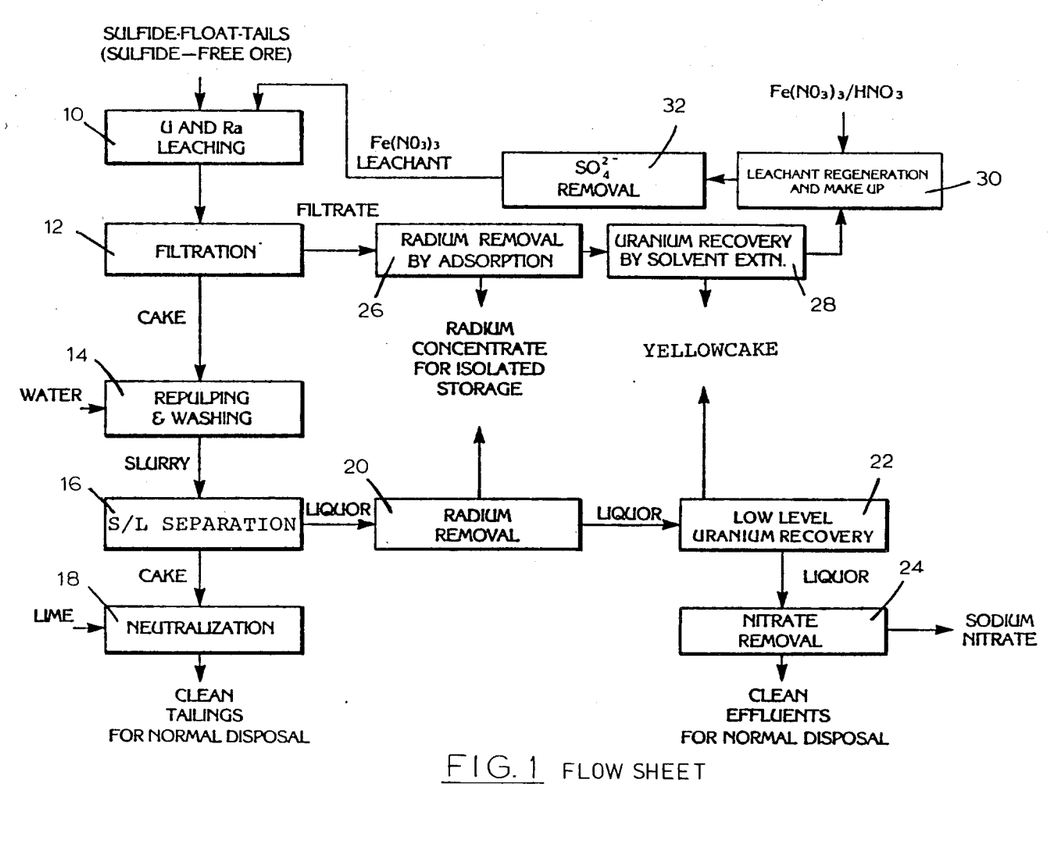
FIG. 1 is a flowsheet of a process of the invention.

The flowsheet of FIG. 1 will now be discussed in detail. The Sulfide-Float-Tail is leached at 10 using an aqueous acidic 0.02M solution of ferric nitrate in 0.02M nitric acid. The treated material is then subjected to a filtration at 12 by means of any known suitable apparatus, such as a drum filter equipped with a spray wash. About 85% of the filtrate will be recovered while about 15% will remain with the cake. The portion of the leachate remaining in the cake will contain dissolved uranium, radium and ferric nitrate and is treated separately to recover the metal values.

In an ideal leach circuit, all the ferric nitrate could be recovered for re-use. In practice, however, a "bleed" of some of the leachant is needed to remove leached components such as heavy metals that would otherwise accumulate. The bleed may be provided by the separate "wash" of the leached solids at 14. If these solids are assumed to be wet with 15% of their weight of leachant (0.02M $Fe(NO_3)_3$ with 0.78 g U per 1), and the L/S ratio is 1.0 ml/g, it can be calculated that the bleed contains about 15% of the ferric nitrate used, or 3 mol (0.241 kg) of ferric nitrate per Mg of solids. The bleed stream also contains about 116 g of uranium per Mg of solids leached, which would justify a separate low level uranium recovery operation. Radium is removed from the bleed liquid at 20, for example by barium radium sulphate coprecipitation or by adsorption on $MnO_2$. The liquid from the radium removal operation is then treated at 22 for the recovery therefrom of uranium, where it can be mixed with lime to precipitate uranium as its hydroxide. The clear overflow from the recovery stage 22 is fed to an anion-exchange bed at 24, employing resin in the $SO^{-2}_4$ form where the $NO^-_3$ ions in the solution are exchanged with the $SO^{-2}_4$ ions from the resin and the final effluent leaves with $NO^-_3$ ion levels of below 10 ppm, meeting the environmental regulations. The anion-exchange resin is then eluted with aqueous $Na_2SO_4$ solution and a sodium nitrate eluate is obtained as a by-product.

Processing of Leachate

The leach liquor from the treatment of the ore at an L/S ratio of 1.0 ml/g with 0.02M $Fe(NO_3)_3$ and 0.02M $HNO_3$ will typically have a pH of 1.5, a uranium content of about 0.78 g/l and a radium content of about 240 pCi/ml. The three most obvious technical objectives in processing the leachate are the separate removal and concentration of (i) radium and (ii) uranium, and (iii) the recovery of the leachant for additional contact with ore, both for economic and environmental reasons. Removal of other components that would otherwise build up in the leachant to an undesirable extent may also be required, as mentioned above.

The leachant from the filtration step 12 is subjected to a radium removal step at 26, and then to a uranium extraction at 28. The recovered leach liquid from stage 28 is now regenerated and the necessary ferric nitrate make-up component is added at 30 as required. The regeneration can for example be by the known process of bacterial action using the species Thiobacillus Ferroxidans. The leach liquid is then subjected to a sulphate removal at 32 in view of the deleterious effect of this ion on the leach step at 10, and the process repeats.

Because of the strict environmental limits on the $NO^-_3$ ion levels in industrial effluents, and due to economic reasons also, the concentration of the ferric nitrate in the leachant should be kept as low as possible and a practical lower limit is found to be about 0.02M. Tests show that there is not sufficient advantage to increasing the concentration above 0.1M to be economically justifiable, and concentrations below 0.01M also are not economical. The leachate must be acidic in character with pH below 1.5, the necessary reduction preferably being produced by the addition as necessary of nitric acid. As indicated, with a ferric nitrate concentration of 0.02M the same concentration of nitric acid is also suitable. For the preferred range of 0.01 to 0.1M ferric nitrate the nitric acid will usually also vary from 0.01M to 0.1M. The presence of acid conditions of the indicated level is necessary to inhibit the hydrolysis of the ferric iron and avoid the formation of colloidal hydrated ferric oxides. These colloidal hydroxides can adsorb a part of the dissolved radium, resulting in higher radium levels in the tailings.

Removal of Radium From Leachant

A satisfactory sub-process for this is adsorption by manganese dioxide. A finely divided $MnO_2$ was prepared by first precipitating the hydroxide from manganese chloride, filtering, and drying in an oven at 110° C. A sample of 100 ml of ferric nitrate leachant (0.02M $Fe(NO_3)_3$, 0.02M $HNO_3$, 110 pCi Ra/mL) was stirred for one hour at room temperature with 1.0 g of the manganese dioxide. The solids were filtered and the washings found to correspond to 3.0 pCi per mL of initial leachate, i.e. 97% of the radium in the initial solution had been retained by the manganese dioxide.

Conventional precipitation of radium as barium radium sulphate is to be avoided in the recycle streams in the processes of the invention because the added sulphate ions would interfere with radium leaching by the recycled ferric nitrate solution.

Removal of Uranium from Leachant

This can be effected by a modified form of the DAPEX process as described in "The Extractive Metallurgy of Uranium" by R. C. Merritt, published 1971 by the Colorado School of Mines Research Institute at pages 204–205, whereby liquid-liquid extraction is used to remove uranium from sulphate leach liquors. The organic extractant is a solution of 10% by volume di-2-ethyl-hexyl-phosphoric acid (D2EHPA) and 5% tributyl phosphate (TBP) in kerosene. 99.7% Uranium was extracted at an aqueous/organic ratio of 4. The uranium-loaded organic phase is stripped with a 10% aqueous solution of sodium carbonate, giving a uranyl carbonate solution. 99.8% of the Uranium is stripped at an organic to aqueous ratio of 4. Tri-butyl phosphate in concentrations of up to 30% vol. in kerosene is also a well-known uranium extractant from nitrate solutions. It may be noted that the uranium concentration can be increased substantially, both in the extraction and stripping operations, by using small and large organic/aqueous phase ratios respectively.

I claim:

1. A process for the extraction of both uranium and radium from uranium ores in the presence of an interfering sulfate ion resulting from the presence of sulfide therein by use of an aqueous ferric nitrate leachant including the steps of:
   (a) mechanically treating the finely ground ore for the removal of sulfide therefrom;
   (b) leaching the mechanically treated finely ground ore with aqueous acidic ferric nitrate solution in a concentration from 0.01 to 0.1M for the removal of uranium and radium therefrom to result in a liquid ferric nitrate leachate containing radium and uranium and a wet cake containing radium, uranium and ferric nitrate;
   (c) treating the ferric nitrate leachate to separate uranium and radium therefrom;
   (d) separately treating the wet cake for removal of retained ferric nitrate and the residual radium and uranium therefrom; and
   (e) recirculating a major portion of the ferric nitrate leachate from step (c) for the leaching of more of the mechanically treated finely ground ore.

2. A process as claimed in claim 1, wherein the said acidic solution is in nitric acid of concentration 0.01M to 0.1M and equal to the concentration of the ferric nitrate.

3. A process as claimed in claim 1, wherein the sulfide is in the form of the minerals pyrite and pyrrhotite and the mechanical treatment consists of flotation removal thereof.

4. A process as claimed in claim 2, wherein the sulfide is in the form of the minerals pyrite and pyrrhotite and the mechanical treatment consists of flotation removal thereof.

5. A process as claimed in any of claims 1 to 3, wherein the acidic ferric nitrate leachant solution is used in amounts to give an effective liquid to solid ratio of from 1 to 2.5 mL/g of ore.

6. A process as claimed in any of claims 1 to 3, wherein the said wet cake is washed separately with an acidic solution of nitric acid at pH below 2.0.

7. A process as claimed in any one of claims 1 to 3, wherein the radium is separated by adsorption thereof by an adsorbent.

8. A process as claimed in any one of claims 1 to 3, wherein the uranium is separated by liquid-liquid extraction with an organic solvent.

9. A process as claimed in any one of claims 1 to 3, wherein the ferric nitrate leachate is treated to remove radium, subsequently is reduced to convert ferric ion to ferrous ion, the uranium therein is removed by liquid-liquid extraction with an organic solvent, and the ferrous nitrate solution is then oxidized to convert the ferrous ion to ferric ion for reuse thereof.

10. A process as claimed in any one of claims 1 to 3, wherein the ferric nitrate leachate is treated to remove radium, subsequently is reduced to convert ferric ion to ferrous ion, the uranium thereof is removed by liquid-liquid extraction with an organic solvent, and the ferrous nitrate solution is then oxidized to convert the ferrous ion to ferric ion for reuse thereof, and including the step of removing sulfate from the ferric nitrate solution subsequent to its oxidation and prior to its resuse as leaching agent.

11. A process as claimed in any one of claims 1 to 3, wherein the said ferric nitrate leachate containing radium and uranium constitutes about 85% of the original ferric nitrate leach solution and is recycled for releaching, the remainder of the original ferric nitrate leach solution is retained by the wet cake, the wet cake is washed to remove the remainder of the ferric nitrate leach solution, and the washing liquid from the wash of the wet cake constitutes a bleed stream for removal of unwanted leached components.

* * * * *